United States Patent [19]

Christian

[11] 4,186,885
[45] Feb. 5, 1980

[54] TRUCK MOUNTABLE ROADSIDE SPRAY DEVICE

[76] Inventor: Paul T. Christian, 528 E. Astor, Colville, Wash. 99114

[21] Appl. No.: 914,533

[22] Filed: Jun. 12, 1978

[51] Int. Cl.² .................. A01C 15/04; A01C 23/00
[52] U.S. Cl. .......................... 239/654; 239/661; 239/662; 239/164; 239/172
[58] Field of Search ............... 222/610, 193, 630–637; 239/654, 655, 661–664, 146, 149, 164, 172, 176, 289, 77, 78

[56] References Cited
U.S. PATENT DOCUMENTS

| | | | |
|---|---|---|---|
| 425,338 | 4/1890 | Muller | 239/654 |
| 1,310,815 | 7/1919 | Weaver | 239/654 |
| 1,724,805 | 8/1929 | Root | 239/654 X |
| 2,597,727 | 5/1952 | Hanson | 239/164 |
| 2,750,708 | 6/1956 | Handfield | 239/77 X |
| 2,958,155 | 11/1960 | Emmerich | 239/77 X |

*Primary Examiner*—Bruce H. Stoner, Jr.
*Assistant Examiner*—Andres Kashnikow
*Attorney, Agent, or Firm*—Wells, St. John & Roberts

[57] ABSTRACT

A spray device is disclosed that is mountable to a truck for movement therewith along a roadway for the purpose of spraying seeds, fertilizer or other solids or liquids onto the roadside. The device includes pivotably interconnected frames that permit pivotal movement of the device about horizontal and vertical axes. The frames releasably mount a portable blower and spray discharge mechanism at their opposite longitudinal ends. A duct interconnects the blower and spray discharge. It provides air for driving a spray discharge mechanism to eject a spray outwardly at a selected trajectory along a roadside area. Various modifications are shown for adapting the structure to spray a liquid mist or for spraying seeds or fertilizer along a roadside area. The device makes use of a portable blower that can be mounted to the frame or removed therefrom without modification.

9 Claims, 9 Drawing Figures

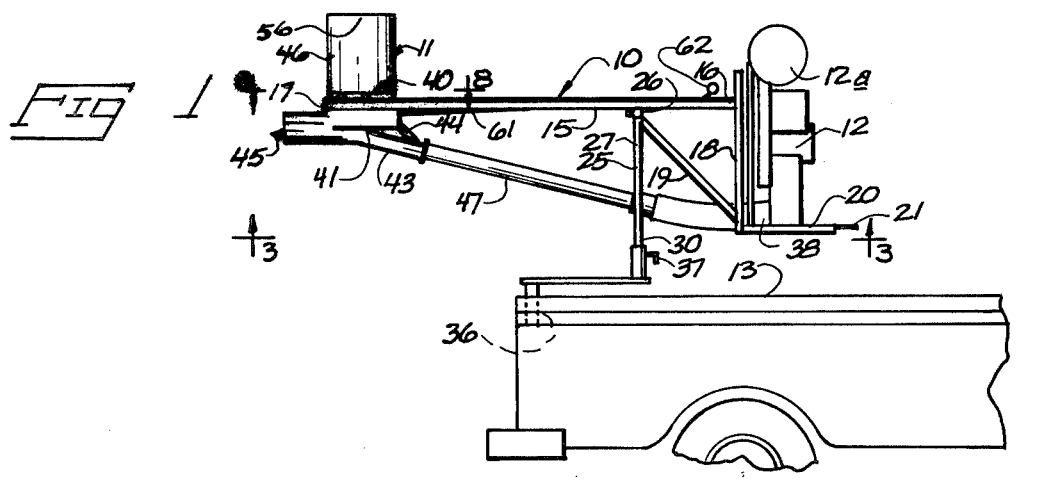
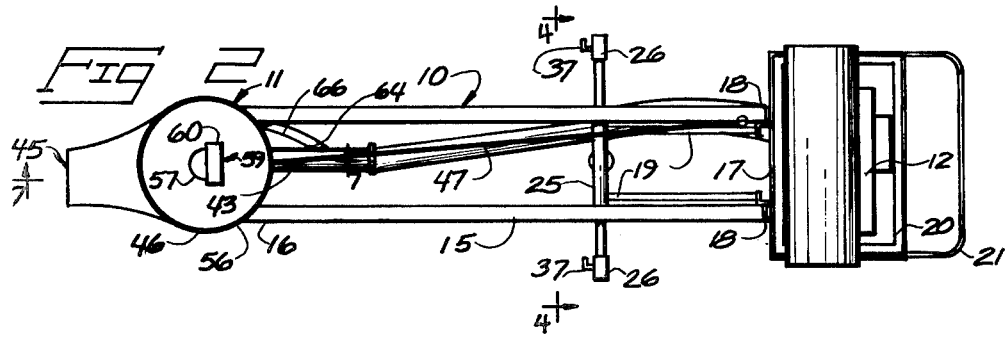
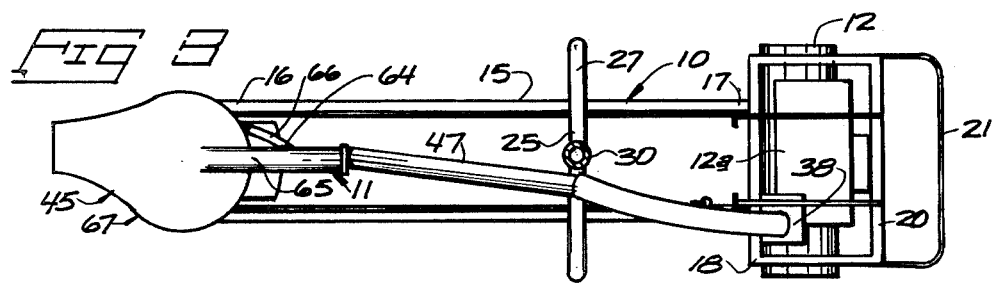
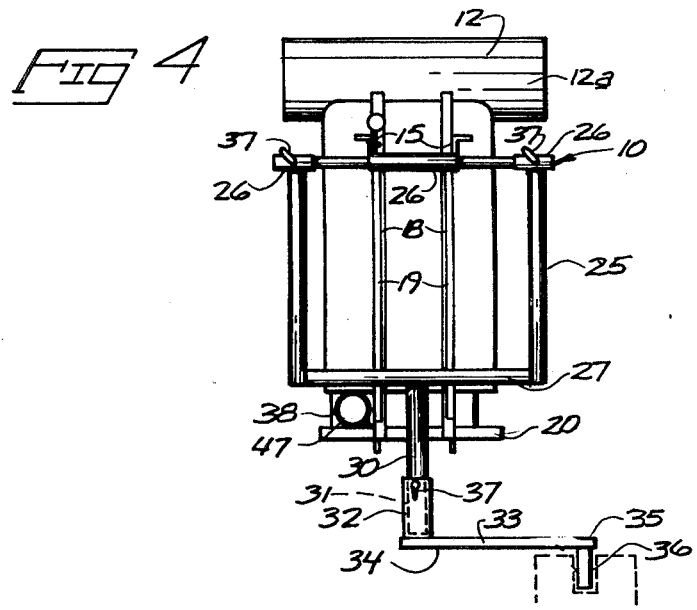
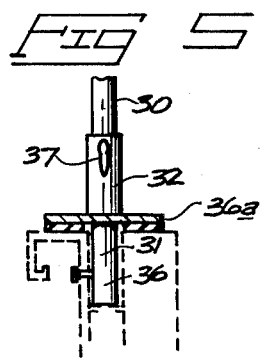

TRUCK MOUNTABLE ROADSIDE SPRAY DEVICE

BACKGROUND OF THE INVENTION

The present invention relates to seed planters, mist sprayers and broadcasting apparatus. More particularly it relates to such an apparatus that is pneumatically driven by a portable blower and that can be mounted to a truck for the purpose of spraying along a roadway as the truck is moved along the adjacent road surface.

Road construction leaves substantial areas of earth along the sides of the roadway that is usually fertile, but is not vegetated. It becomes desirable to seed and encourage growth along such areas both to enhance scenic beauty and to control soil erosion. Other vegetated areas along established roadways require periodic fertilization and weed control.

One of the problems in seeding and fertilizing soil along the sides of highways has been the cost involved in supplying sufficient manpower to move on foot to spread the seed and fertilizer. It therefore becomes desirable to provide some form of device that will facilitate spreading of seed, fertilizer, or liquid mist along the sides of roadways in a quick and efficient manner.

BRIEF DESCRIPTION OF THE DRAWINGS

FIG. 1 is a side elevational view of the present invention shown mounted to a vehicle;

FIG. 2 is an enlarged top plan view of my invention;

FIG. 3 is an enlarged bottom sectional view taken substantially along line 3—3 in FIG. 1;

FIG. 4 is an enlarged sectional view taken along line 4—4 in FIG. 2;

FIG. 5 is a fragmentary enlarged view of an alternate form of support;

DETAILED DESCRIPTION OF A PREFERRED EMBODIMENT

Figure 6:
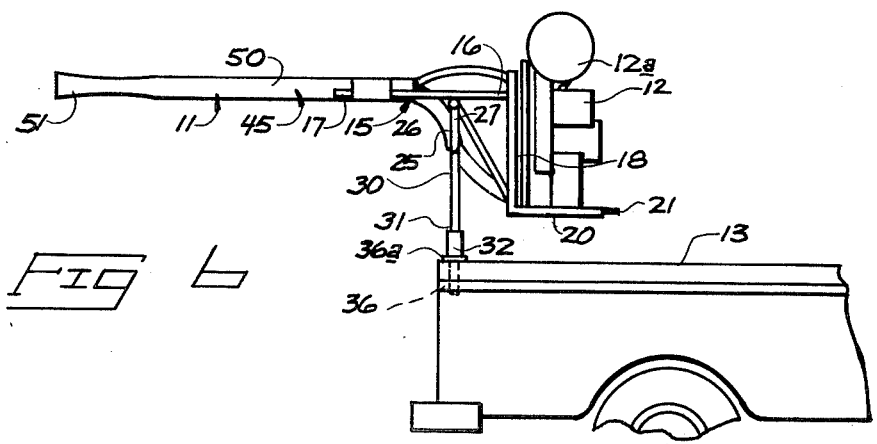
FIG. 6 is a view similar to FIG. 1 only showing a modified form of the present invention.

A spray device embodying a preferred form of the present invention is illustrated in the accompanying drawings and is generally designated therein by the reference character 10. Device 10 is adapted to mount a conventional portable blower 12 and an interconnected spray discharge means 11.

The portable blower 12 is preferably a backpack type mist sprayer that may be mounted to and removed from the present structure without requiring modification. Such blowers may be operated to produce a pressurized airflow that is either dry or moistened through an integral mist-forming apparatus 12a. The present device combines the blower and spray discharge means 11 for coaction to spread seed, fertilizer, or a liquid mist along sides of roadways from a truck such as that shown at 13. The term "spray" as used herein is to be taken broadly as including an air suspension of either liquid or solid particulate material.

The present device 10 includes a mounting means 15 for receiving and supporting the spray discharge means 11 and portable blower 12. Mounting means 15 is elongated and includes one end 16 that provides a bracket 18 for releasably mounting the blower 12. The remaining end 17 mounts the spray discharge means 11. A tray 20 on bracket 18 receives and supports the blower 12. A handle 21 extends from tray 20 as a handgrip for an operator stationed in the truck bed.

Mounting means 15 is pivotably carried by an articulating frame assembly 25. Pivots 26 are provided interconnecting the mounting means 15 and frame 25 to enable pivotal movement of the two about a horizontal pivot axis. This axis is located along the length of the elongated mounting means 15 at a fulcrum point wherein the spray discharge 11 and the portable blower 12 are substantially balanced. Of course, this balance will not be precise as the material level within the spray discharge and the amount of fuel stored within the portable blower will continuously vary during use. However, the balance that may be maintained is such that the operator may easily pivot the device about the horizonal pivot axis.

Pivot 26 are located on the mounting means 15 at upper ends of a yoke member 27 that is included as an element of the articulating frame means 25. Yoke member 27 extends downwardly from pivots 26 to an upright support 30. It is the upright support 30 that facilitates pivotal movement of the device 10 about a vertical axis. It is also the support 30 that acts as means for mounting the device adjacent the rear of the truck 13.

Two forms of the support member are shown in the drawings in FIGS. 4 and 5. FIG. 4 illustrates an offset member by which the device may be situated inwardly of the side wall of a truck 13 to facilitate operation from the truck bed. FIG. 5 illustrates a direct stake pocket mount that situates the device adjacent to the side of the associated truck.

In either form, upright support member 30 is laterally centered on the yoke member 27 to at least partially balance the elements supported thereby. Therefore, the vertical axis of articulation for the articulating frame is provided at the support member 30.

The upright support member 30 may be described more specifically as including a first upright tube member 31 that is rotatably held within a second upright tube member 32. An offset bracket 33 is shown in FIG. 4 that is fixed to a lower end of the second upright tube member 32 at an end 34 thereof. The post 36 depends from an opposite end 35 of the offset bracket. Post 36 is receivable within an appropriate stake pocket of the truck 13.

The direct mount illustrated in FIG. 5 does away with the offset bracket 33 and combines the second upright tubular member and post 36 into a single element received within the truck stake pocket. A collar 36a is provided on member 32 for abutting the truck side rail.

Since trucks are typically provided with several of the stake pockets on either side rail, it may be understood that the present device may be mounted to and operated from either side of an associated truck.

Pivotal movement of the mounting means and articulating frame about the horizontal and vertical axis may be selectively limited through means of a number of lock screws 37. Two of the lock screws 37 are situated at the pivot 26. A single lock screw 37 is located to communicate between the tube members 31 and 32. The screws are threadably engaged with their respective frames and may be selectively tightened to lock the adjacent elements against relative movement.

It may become desirable to tighten the lock screws 37 when the device is to be transported to and from a jobsite without removing it from its mounted position on the truck. The lock screws also are functional to enable one man to operate both the present device and the associated truck. The device may be positioned and locked in place by the vehicle driver. The driver may then move the truck along the associated roadway as the spray device is operating.

The spray discharge means 45 is shown in two forms in the accompanying drawings. Briefly, in a preferred form (FIGS. 1-3, 7 and 8), the spray discharge means 45 includes a hopper 46 for receiving particulate material such as seeds, fertilizer, etc. It is associated with a duct 47 leading from a discharge 38 of the portable blower to communicate with the hopper and leading onto a spray discharge opening at its outward end. A particle release means 48 is associated between the duct 47 and hopper 46. The particle release means is driven to release the particulate material into the airstream flowing through duct 47 through operation of a pneumatic drive means 49.

Figure 7:
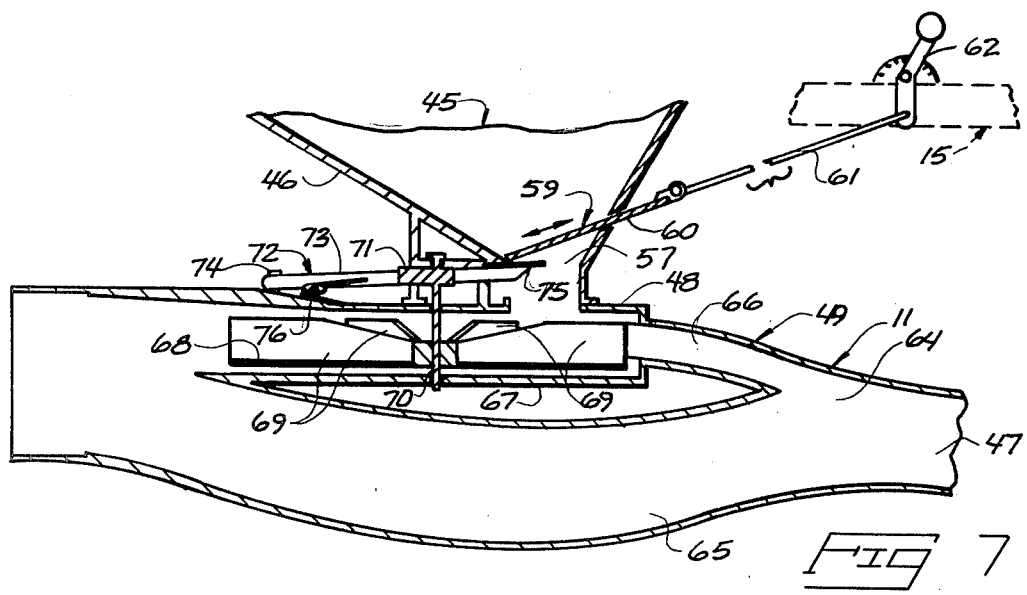
FIG. 7 is an enlarged sectional view taken substantially along line 7—7 in FIG. 2.
Figure 9:
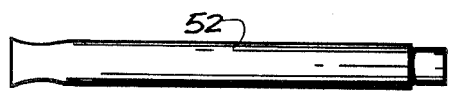
FIG. 9 is a reduced view of a duct extension for increasing the operative range of the present device.

The hopper 46 of the preferred form extends from an open end 56 to a reduced lower discharge 57. The rate of particulate flow through the discharge 57 is controlled by means of a discharge opening adjustment 59 (FIG. 7). This adjustment includes a plate 60 that is slidably mounted to the hopper 46. It may be selectively moved across the opening at the discharge end 57 to meter the flow of material leaving the hopper. The slide plate 60 is adjustably moved by a rod 61 and lever 62 (FIGS. 1 and 7) that are provided for operator control. The rod 61 extends from the slide plate 60 rearwardly toward the portable blower. Lever 62 is mounted to the framework adjacent to the blower for access by the operator. Various positions may be indicated alongside the lever for enabling proper settings for differing materials.

The pneumatic drive means 49 is also utilized in conjunction with the preferred form of spray discharge means 45. It includes a bifurcation 64 within the duct 47. The bifurcation 64 forms a first duct branch 65 and a second duct branch 66. The first branch 65 provides passage for a main airstream from the portable blower while the second branch 66 receives a portion of the main airstream and directs it to the particle release means 48. The branches 65, 66 are shown separated but may be molded or otherwise manufactured as a single integral unit.

Figure 8:
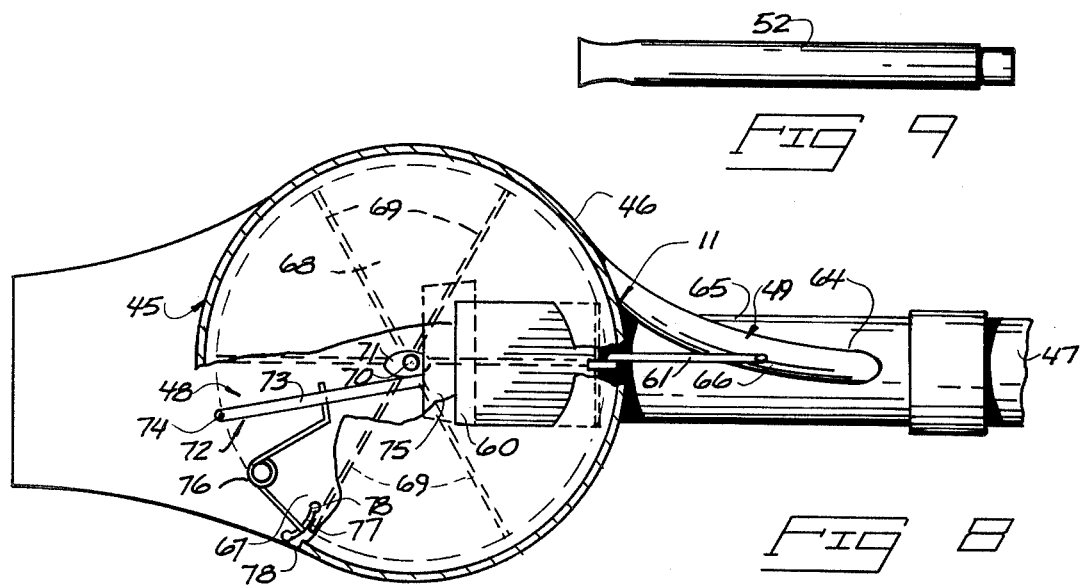
FIG. 8 is an enlarged fragmentary sectional view taken substantially along line 8—8 in FIG. 1.

A manifold 67 is in open communication with the second branch 66 and leads into the main branch 65. The manifold is substantially circular in cross section as shown by FIG. 8. The bifurcation branch 66 leads tangentially into the manifold. A centrifugal seed spreading disk 68 is provided within the manifold 67. It includes a number of radially oriented vanes 69. The air entering tangentially into the manifold is directed against the vanes 69 to spin the disk 68 about the axis of a shaft 70. The shaft 70 is upright and located slightly to one side of the discharge end for hopper 46. Shaft 70 is mounted by bearings or bushings to allow relatively free rotation of the disk within the manifold in response to air pressure exerted through the second branch 66 of duct 47.

Also, rigidly connected to the disk 68 is a cam 71. The cam may be fixed to the disk or otherwise mounted for rotation in response to similar rotation of the disk 68. The cam 71 is of the eccentric plate variety and is utilized as the actuator for a shaker means 72. Means 72 is provided for the purpose of agitating particulate material within the hopper 46 adjacent the discharge end 47. With shaker means 72, a continuous even flow of material may be dispensed through the hopper according to the flow rate determined by the discharge opening adjustment 59.

The shaker means 72 includes an arm 73 that is mounted at a pivot 74 on the manifold housing 67. Arm 73 extends inwardly toward the discharge end 57 of the hopper to mount a shaker plate 75. Plate 75 is situated closely adjacent to the slide plate 60 and is pivoted to oscilate in a horizontal plane adjacent to the plate 60 so as to provide agitation of the material but not hamper or vary the size of the hopper discharge opening. The arm 73 is urged against the cam 71 by a spring 76.

Spring 76 is a simple torsion spring having one end mounted to the arm 73 and a remaining end adjustably fitted within a slot 77. The slot 77 has several indentations 78 along its length that enable selective adjustment of spring tension against the arm 73. Therefore, it is possible by releasing tension on the spring 76, to disengage the arm 73 from effective contact with cam 71. This is desirable in some instances where a relatively fine, heavy material is being applied that would normally press against shaker plate 75 with sufficient force to bind the plate and prevent rotation of the disk 68.

A modified form of the spray discharge means 45 (FIG. 6) simply comprises a duct 50 that leads outwardly from the portable blower to a nozzle 51 at a discharge end. The portable blower in this form is a mist spraying device that includes an integral fluid supply tank associated with a blowing mechanism for producing a mist that may be discharged through the nozzle 51 and applied in a selected trajectory toward the roadside. An example of such a blower may be found in U.S. Pat. No. 2,958,155. This form is utilized for spraying liquified fertilizer, insecticide, weed killer, etc. The duct 50 of this form may be substantially identical to duct 47, there being a cap or other appropriate closure device for sealing off the opening that would ordinarily lead to the hopper and particle release means 46 and 48 respectively.

With either form briefly described above, a duct extension 52 may be provided. The extension 52 may be slidably engaged at the discharge opening of either duct 47 or duct 50 to increase the effective range of the device. The duct extension 52 may simply be slidably engaged within the discharge ends of duct 47 or duct 50 and locked in place by means of a set screw or other appropriate attachment device (not shown).

Prior to use, the device is mounted to the stake pocket of a truck. It is preferred to mount the device at the left (driver's side) for one man operation or the right side for use in conjunction with an operator and a driver. The hopper or mist spray unit may then be loaded with the desired particulate matter or fluid. The device is then ready for operation.

If two workers are used, one may stand behind the device with his hands gripping the handle 21 while the other drives the truck. The one worker may freely pivot the device about the horizontal or vertical axis or both to direct the spray along the roadside. This is done as the vehicle is driven along the roadway so that the soil along the roadside is quickly and efficiently covered. If the width of the roadway permits, it is possible to spread material to both sides of the roadway in a single pass of the vehicle. Usually, though, a pass is made along one side of the roadway and then a return pass is made along the other side to complete the operation.

In some situations it is possible to use only one worker to complete the above described operation. The worker must first position the device and set the lock mechanism to prevent undesired movement of the device as the truck is moved along. He then starts the portable blower to initiate delivery of the spray to the roadside area. He can then driven the truck along the roadside with the device locked in position to automatically spray the roadside area with material.

Of course, according to the type of material being utilized to form the spray, the operator may desire to selectively adjust the flow rate control and the shaker means 72 to accommodate specific forms of material. He may also wish to adjust the range of seed trajectory by adding or removing the duct extension 52.

The above description is given merely as an example and is not intended to restrict the scope of my invention. Limitations on the scope of my invention are set only by the following claims:

What I claim is:

1. A spray apparatus for broadcasting solid particles, such as seeds or fertilizer, comprising:
 an upright storage hopper;
 particle discharge means at the lower end of the hopper for dispensing an even flow of particles from within the hopper;
 a radial vaned broadcast disk mounted beneath said particle discharge means for rotation about a central upright disk axis;
 a blower;
 a duct having one end operably connected to the blower for receiving a stream of pressurized air therefrom, said duct extending from said one end to a discharge nozzle at its remaining end;
 said duct being bifurcated with a first branch thereof forming a main airstream;
 and pneumatic drive means operably connected to said disk, comprising:
 a second branch of the duct leading to the disk for directing forced air against the disk vanes for rotating the disk about its axis to move particles which fall onto the disk from within the hopper;
 a manifold openly communicating with both branches of the duct for receiving particles from the disk and pressurized air from the blower and for mixing the air and particles to form the spray.

2. A spray device utilizing a portable blower and mountable to a truck for spraying liquid or solid particles along a roadside as the truck is moved along an adjacent roadway, comprising:
 support means for mounting the device adjacent the rear of the truck;
 mounting means for receiving the portable blower;
 spray discharge means operatively connectable to the portable blower for directing spray away from the truck; and
 articulating frame means supporting the spray discharge means and interconnecting the support means and mounting means for enabling the spray discharge means to be pivoted horizontally and vertically with respect to the support means such that the spray may be discharged onto the roadside at a selected trajectory;
 said mounting means being comprised of an elongated frame and is mounted to the articulating frame means for pivotal movement about a horizontal axis and wherein the elongated frame is adapted to receive the portable blower on one side of the horizontal axis and the spray discharge means is primarily situated on an opposite side of the horizontal axis so that the spray discharge means and portable blower may be substantially balanced about the horizontal axis.

3. A spray device utilizing a portable blower and mountable to a truck for spraying liquid or solid particles along a roadside as the truck is moved along an adjacent roadway, comprising:
 a support means for mounting the device adjacent the rear of the truck;
 mounting means for receiving the portable blower;
 spray discharge means operatively connectable to the portable blower for directing spray away from the truck, said spray discharge means being comprised of:
 a particle receiving hopper on the mounting means having a particle discharge at a lower end thereof;
 particle release means on the hopper operable to release particles from the hopper at the discharge opening;
 a duct having one end adapted to be connected to the portable blower for receiving pressurized air therefrom and extending from the one end to openly communicate with the hopper discharge opening and on to a spray discharge opening at a remaining duct end;
 pneumatic drive means associated with the duct adapted to employ a portion of pressurized air within the duct to operate the particle release means to release particles from the hopper and into a main airstream flowing outwardly through the duct, thereby forming the spray; and
 articulating frame means supporting the spray discharge means and interconnecting the support means and mounting means for enabling the spray discharge means to be pivoted horizontally and vertically with respect to the support means such that the spray may be discharged onto the roadside at a selected trajectory;
 said duct being bifurcated with a first branch thereof forming a main air stream;
 said pneumatic drive means being comprised of:
 a second branch of the duct leading to the particle release means for directing forced air to drive the particle release means to discharge particles from the hopper;
 a manifold openly communicating with both branches of the duct and mounted to the particle release means for receiving particles from the hopper and pressurized air from the portable blower and for mixing the air and particles to form the spray;
 said particle release means being comprised of:
 a radial vaned broadcast disk mounted to the hopper for rotational movement about a disk axis in response to air pressure directed against the vanes through the second branch of the duct;
 a cam mounted to the disk for rotation therewith;
 shaker means operatively connected to the cam for operation in response to movement of the cam for agitating particles within the hopper adjacent the discharge opening thereof; and
 discharge opening adjusting means for selectively setting the size of the hopper discharge opening.

4. The device as defined in claim 3 wherein the shaker means is selectively disengageable from the cam.

5. A spray apparatus for broadcasting solid particles, such as seeds or fertilizer, comprising:

an upright storage hopper having a particle discharge at a lower end thereof;

particle release means operable to drop particles from the particle discharge of the hopper;

a blower;

a transverse centrifugal particle spreading disk located vertically beneath the particle discharge of the hopper, said disk being rotatably mounted about an upright axis to one side of the discharge;

a plurality of radial vanes fixed to the upper surface of the disk and facing upwardly toward the particle discharge of the hopper;

drive means for rotating the disk about said upright axis;

duct having one end operably connected to the blower for receiving a stream of pressurized air therefrom, said duct extending from said one end to a discharge nozzle at its remaining end;

and a manifold enclosing the disk, said manifold being in open communication with said duct and leading toward the discharge nozzle at a location intermediate the ends of the duct, whereby the particles dropped from the particle discharge of the hopper falls upon the rotating disk and are flung into the pressurized stream of air within the duct prior to discharge of the mixed particles and stream of pressurized air at said discharge nozzle as a spray.

6. An apparatus as set out in claim 5, further comprising:

pneumatic drive means associated with the duct adapted to employ a portion of the stream of pressurized air within the duct to operate the particle release means to release particles from the particle discharge of the hopper and into a main airstream flowing outwardly through the duct, thereby forming the spray.

7. An apparatus as set out in claim 5 wherein the duct is bifurcated with a first branch thereof forming a main airstream, and wherein said drive means is comprised of:

a second branch of the duct leading into the manifold and directed tangentially toward the vanes on said disk for directing a stream of air against the vanes to spin the disk about its upright axis.

8. An apparatus as set out in claim 5 wherein the particle release means is comprised of:

a cam mounted to the disk for rotation therewith; and shaker means operatively connected to the cam for operation in response to movement of the cam for agitating particles within the hopper adjacent the discharge thereof.

9. An apparatus as set out in claim 5 wherein the duct is bifurcated with a first branch thereof forming a main airstream, and wherein said drive means is comprised of:

a second branch of the duct leading into the manifold and directed tangentially toward the vanes on said disk for directing a stream of air against the vanes to spin the disk about its upright axis;

said particle release means comprising:

a cam mounted to the disk for rotation therewith;

shaker means operatively connected to the cam for operation in response to movement of the cam for agitating particles within the hopper adjacent the particle discharge thereof; and discharge opening adjusting means for selectively setting the size of the particle discharge of the hopper.

* * * * *